US007654591B2

(12) United States Patent
Marble

(10) Patent No.: US 7,654,591 B2
(45) Date of Patent: Feb. 2, 2010

(54) DUAL OR TRIPLE SURFACE SNOW REMOVING DEVICE

(76) Inventor: Jeffery Boyd Marble, 1478 Redondo Ave., Salt Lake City, UT (US) 84105-3710

( * ) Notice: Subject to any disclaimer, the term of this patent is extended or adjusted under 35 U.S.C. 154(b) by 0 days.

(21) Appl. No.: 11/704,485

(22) Filed: Feb. 8, 2007

(65) Prior Publication Data

US 2007/0187964 A1 Aug. 16, 2007

Related U.S. Application Data

(60) Provisional application No. 60/773,779, filed on Feb. 16, 2006.

(51) Int. Cl.
*A01D 9/00* (2006.01)
*A47L 13/00* (2006.01)

(52) U.S. Cl. ........................ 294/51; 294/54.5; 15/244.1

(58) Field of Classification Search ................... 294/51, 294/53.5, 54.5; 37/283, 284, 295; D8/10; 15/244.1, 245, 245.1; 172/372
See application file for complete search history.

(56) References Cited

U.S. PATENT DOCUMENTS 841,848 A * 1/1907 Conner ...................... 294/54.5
1,198,206 A * 9/1916 Offerman et al. ........... 400/274
1,524,639 A * 1/1925 Grady ......................... 37/284
4,317,250 A * 3/1982 Shutts ......................... 15/245
4,559,726 A * 12/1985 Moisan ........................ 37/285
4,597,204 A * 7/1986 Heiden ........................ 37/285
5,440,828 A * 8/1995 Simpson ...................... 37/285
5,528,793 A * 6/1996 Schbot ...................... 294/54.5
5,676,413 A * 10/1997 Hauck ....................... 294/54.5
5,727,829 A * 3/1998 Bellichak .................. 294/54.5
2006/0005334 A1* 1/2006 Yang ........................... 15/105
2006/0254009 A1* 11/2006 Tsai et al. ..................... 15/121
2007/0028487 A1* 2/2007 Larson ........................ 37/278

* cited by examiner

*Primary Examiner*—Paul T Chin
(74) *Attorney, Agent, or Firm*—Robert L. Lundstrom

(57) ABSTRACT

A snow shovel includes a blade, a handle stem, a stabilizer bar, and multiple positions to couple the handle stem to the blade. The blade may include a soft edge and a hard edge. One position is achieved by coupling a taper in the handle stem to the blade at a strap for shoveling snow at the ground level with the hard edge. One position is achieved by coupling the taper in the handle stem to the blade at a folded tab for shoveling snow off a car with the soft edge.

20 Claims, 8 Drawing Sheets

DUAL OR TRIPLE SURFACE SNOW REMOVING DEVICE

CROSS REFERENCE TO A RELATED APPLICATION

The present application claims the benefits of U.S. provisional application Ser. No. U.S. 60/773,779 filed Feb. 16, 2006

TECHNICAL FIELD OF THE INVENTION

The present invention relates to hand held tools and more particularly to the field of manual snow removing devices. In particular it relates to a hand held snow removing device for removing snow from vehicles, cement driveways, sidewalks, steps, wooden decks, and steps carpeted porches, and steps, and to remove snow from between the motor vehicles etc.

BACKGROUND OF THE PRIOR ART

Hand held snow shovels, plows snow rakes and brushes for moving and removing snow have been around for a long time. Hence it is common knowledge that to remove snow or like material from the driveway, sidewalks or the like it is necessary to have a shovel or blade made of a material that is hard enough to resist abrasion, flexing fatigue, and the usually wear and tear that snow shovels encounter, and still be able to support the weight of the snow or like material, but still be light weigh enough to be wielded in a fashion that is consistent with shoveling snow. Considering the problem, for hard surface snow removal, the past art gives us more solutions than there are problems. Ref: to U.S.PTO web site advanced search ccl/294/54.5 this profuse reservoir of patents is for a common purpose, to be able to do the job faster and or easer. As a result there have been many attempts at dual edged shovels and articulating blades or handles, however most of the past art has not come to fruition since it has proved to be too expensive, clumsy, heavy or slow, due to the material used in the manufacturing of the devices, over engineering, or just the mechanical nature of the inventions or a host of other reasons. It seems just the opposite is true for the prior art concerning a slightly softer and or more delicate surface such as synthetic, or plastic decks and steps, wooden decks, and steps or the like, and more delicate still, carpeted porches and steps or the like. Not many, if any, examples exist of a snow removal tool designed specifically for these softer surfaces that would easily scar, scratch or otherwise be damaged using a hard plastic or metal blade. One example of a dual purposes snow removal tool is U.S. Pat. No. 5,727,829 but in the past the only thing that has been widely available is a common broom, which is hugely inefficient in regards to effort and time when one is working to clear more than just a small area of snow or like material. Finally past art concerning removing snow from automobiles one could site many types of squeegees or brushes most of which fail to provide an adequate combination of snow removal tool attributes, namely light and strong. The virtues of the lighter weight brushes is taken out of existence by having too repeat the same stroke too many times for too little results. If the snow is too deep or heavy the squeegees that can do large areas or handle the deep heavy snow are generally too heavy and do not provide adequate protection for the paint on a vehicle with one notable exception U.S. Pat. No. 4,317,250. This is a great tool for taking the snow off the cars, but the shortfall is that it can't convert to scrape the ground where the snow is dumped. No dual purpose. So with the past art we usually find many different types of tool configuration for three different types of surfaces, with some dual purpose tools in patent only as the production viability of the dual tool reality has heretofore been mostly an illusion, that's the problem when removing a lot of snow from a lot of cars in a large parking lot like an automobile dealership or a driveway with several cars parked there. The process of removing the snow is like a production line where one must push or pull the snow off from the cars only to trample it down between the cars, making it not only difficult to remove but very slippery, icy and dangerous to walk on. Often times the snow will become encrusted onto the black top, cement or other surfaces, because the sun can't get in between the cars to melt the snow or like material away, it can't be removed with the current art as a hard plastic or metal shovel will damage the cars paint. A snow blower may do even more harm. So it sometimes becomes necessary to move all of the cars and plow the entire lot with a snow plow truck which is very time consuming and costly to the dealer principal, business owners, and home owner. Thus what is needed is one tool that can safely, quickly, and inexpensively remove snow or the like material off of and immediately out from between the vehicles as well clear off the driveways, porches, steps, windshields & windows on cars, regardless of their respective underlying material compounds of cement, wood, synthetics, plastics, carpet, paint, glass, etc. while in the cold wet weather, without having to go for a different tool. That will avoid scratching or marring the finish of the vehicles. To remove snow off all of these surfaces stated above without damage of any kind. Without having to spend time on the encumbrances of the prior art. The invention disclosed and claimed in this application presents a solution to all of these and other problems.

SUMMARY OF THE INVENTION

It is a primary object of the present invention to provide a dual edged snow removal tool that is without peer, to surpass all efforts and shortcomings of the prior art concerning, the manual removal of snow and like material from a variety of surfaces, and vehicles, from between the vehicles, and other objects, safely, inexpensively and fast.

By rendering a more versatile, practical, common sense approach, to the manufacturing of said devices, via some unique design philosophies and material combinations, heretofore known to the art.

It is also an object of the present invention to provide a combination surface snow removing device that provides complete protection against scuffs scratches marring tearing and perforating any surface while in use, even in extremely frigid temperatures.

It is further an object of the present invention to provide a quick, easy to use light, tiered double edged blade, one edge that is hard, strong, abrasion resistant, plastic and the other edge with a relatively thick molded cross linked, physically blown, closed cell polyethylene low density foam that has a extremely low moisture absorbance factor thus preventing the taking on of any harmful amounts of water, keeping said tool light weight and free of ice, while working in a wet environment at low temperatures.

It is another object of the present invention to provide a snow removing device with a two piece handle. The top half of said handle will be a strong light plastic tube or pipe The lower end is made from wood said handle is tapered towards the distal end, and employs a slot (approx. 3" long) running parallel and in line with said blade and said taper to accommodate a relatively large clip (preferably a piece of ¼" round bar) which allows for articulation and is a pivot point for said handle. Said handle slides slightly side to side over and under the clip through the slot in said handle regardless of which edge of said blade is in use. Said slot creates all of the available angles, for both the soft edge and hard edge of said blade said clip assist in the attachment of said two piece handle to said blade.

It is also an object of the present invention to provide a relatively large clip that works like a stabilizer bar or a compression brace that spans the back of said blade at mid point clipping into the stabilizer bar wells on the vertical sides of said blade. Said clip parallels the working edges of said blade. The clip is instrumental in connecting said handle to said blade making the said tool whole, and acts as a pivot point for said handle to achieve a near 180 degree flop of said handle. This clip helps regulates all toque issues of said blades attitudes and angles as it relates to contact with ground and the forces associated with the removal of snow or like material.

It is another object of the present invention to provide a snow removing device with a mid section hand grip that doubles as a fortifying union. With an optional ice scraping frost peeling D-ring hand grip at the proximal end of said handle.

It is also an object of the present invention to provide two handle wells in said blade one at the top edge & center and one at the bottom edge & center. For said pivoting handle to set in. And two stabilizer bar wells, for the clip (or stabilizer bar) placement. These features allow the worker quickly, choose and use the softer edge or the hard edge of said blade, at any available angle.

According to another preferred embodiment it is a primary object of the present invention to provide an optional foam edge (or cap) and a different lower handle piece (handle stem) which has a hole in place of the slot, for said clip, and that said handle stem fastens directly to the blade/shovel head with the standard bolt, washer, & nut design (See drawings) this tool will be used as a snow removing device that has limited articulation. The said tool is very similar, but the handle does not pivot. Absent from this tool is the lip, slot, and strap. So for all intent and purpose it is more or less just a common garden variety snow shovel that has the heretofore unknown advantage of a cross link physically blown close cell polyethylene foam cap on the proximal edge of the plastic blade. This simpler version of the slick snow stick has a similar purpose, to the pre mentioned tool, to manually removing snow from objects with an elevated plane, and or ground based structures. The best example would be the removal of snow from vehicles or the like, and then removing the snow immediately from between those vehicles or other objects.

These and concurrent objects and advantages will be apparent as more is disclosed about the present invention through the description and drawings that follow.

To achieve these objects a manual snow removal device is provide, that has a two piece handle the top part a plastic tube or pipe and a lower part, a turned round handle stem, with a slot towards the tapered distal end, the taper on the handle stem slides under a strong flexible strap attached to the back of the blade, spanning the distal handle well, said strap provides an auto lock and unlocking capability to expedite the switch over from hard surface snow removal, to a softer more delicate surface. The said plastic handle part and said handle stems combined length is approx. 60"and it is approx 1" round.

This tool includes a preferred embodiment of a blade or shovel approximately 11" high 19" wide 1/16" thick with the replaceable foam edge being thicker. The blade will be of medium size but with a comparatively tighter radius for a snow shovel, the shovel or blade consist of two materials (preferable) a heat molded plastic base, or an optional plastic injected base. A molded cross linked, physically blown, closed cell, polyethylene foam with a density of 2 lbs per cubic foot, is used as the other edge (or foam cap). Said foam piece has a slit 3" deep running length wise along the bottom, and at the other end it has a relatively sharp point said foam stretch fits over the top or proximal edge of said plastic blade, this foam cap has been formed or molded into shape with heat and pressure in so doing forms a skin, that further enhances the durability and weather proofing of said foam edge, which also helps stop the accumulation of water in any form but especially ice, thereby keeping said foam edge light, flexibly, semi soft still pliable firm and safe to use in very cold weather. This skin provides a friction co efficiency that is extremely beneficial to said foam, and is a necessary attribute for the enhancement of the tools performance, and to the life span of this snow removal tool. The exposed face and back of the blade is approximately ⅔ plastic ⅓ foam. The extreme distal ends of the blade/shovel the tips are rolled up slightly to provide an added layer of safety concerning personal injury, as well as guarding against scratches to paint on vehicles and like surfaces. The rolled tips are necessary to create bow ability along the very distal edge of the blade that assists in the auto lock on feature when changing functions. This necessary safety feature serendipitously helps the tool glide over inconsistencies in the work area. There is one large clip which fits snugly through two slots on the back of said blade paired up with two tabs that have been folded back inside the concaved blade creating wells (or sockets) located on or near the two arched vertical side's approx 5 inches off the distal edge of said blade. This large clip (stabilizer bar) goes through a slot in the handle stem just above the tapered part of the handle stem, allowing for approx 180 degree of pivoting action, and a right and left tilt motion (articulation) in the handle. The articulation is halted by a kick pin in the handle stem located approximately ¼ below the top of said slot. There are two handle wells, for said handle to lock into, the (top) soft edge handle well is created by an on center tab off the proximal end of the plastic blade; it's formed by folding the tab back on the blade its self. This forms a dual dihedral lip (or well). The said tapered handle stem slips under said lip stopping the thrusting handle stem from going through the said molded foam edge, this lip will keep the said handle in place until secured with the kick pin. The hard plastic (distal) handle well, is located on center, approximately 1¼" off the distal horizontal edge protruding into the inside of said plastic blade. The said handle is then held securely in place by a kick pin and a strong flexible strap which spans across the back of said handle stem taper, and the distal handle well, creating a slip into auto lock system for said handle thereby eliminating the need for the slower mechanical locking devices.

DETAILED DESCRIPTION OF THE INVENTIONS PREFERRED EMBODIMENT

Figure 1:
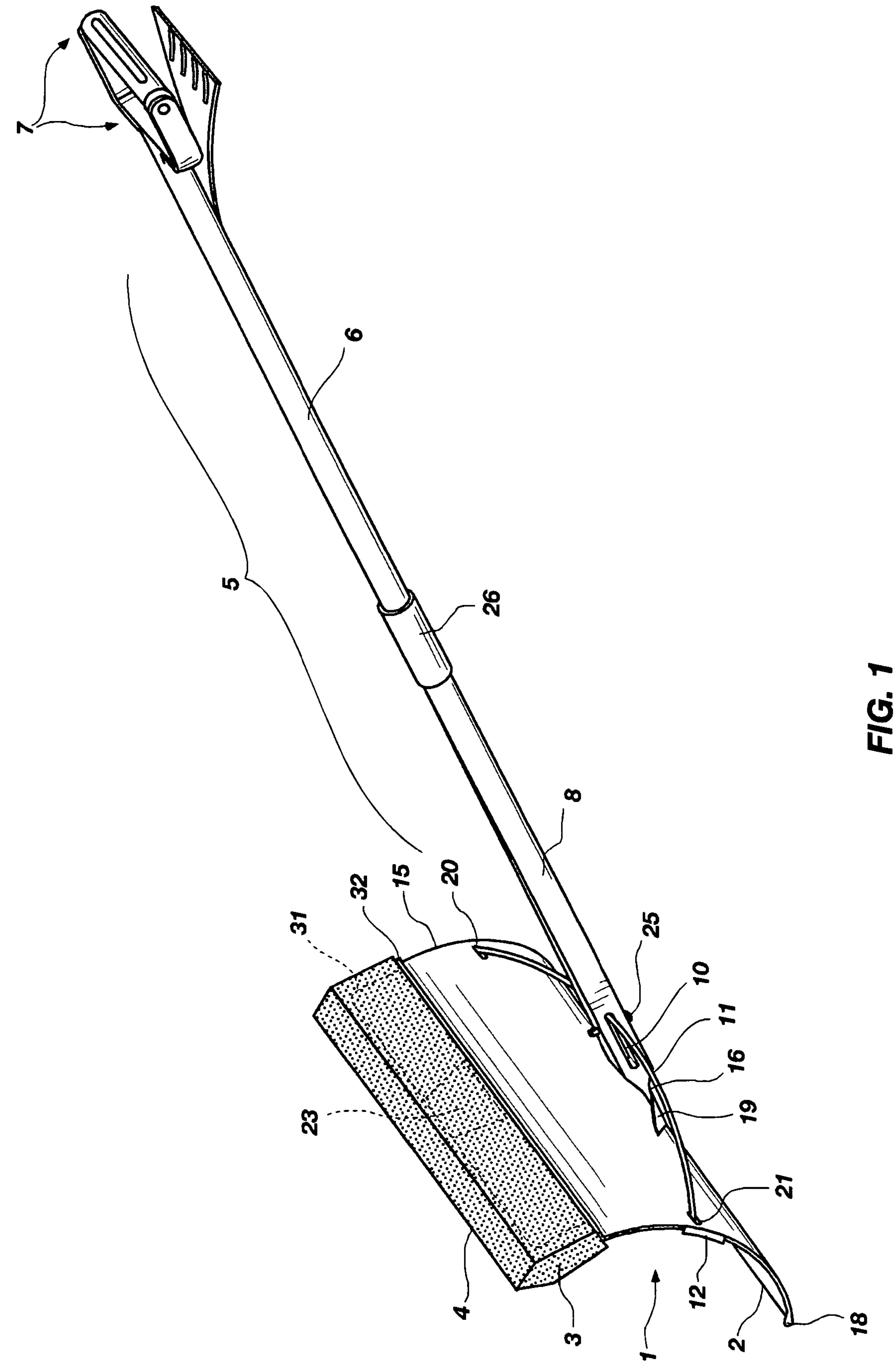
FIG. 1 is a perspective view showing one preferred embodiment of the present invention.
Figure 2:
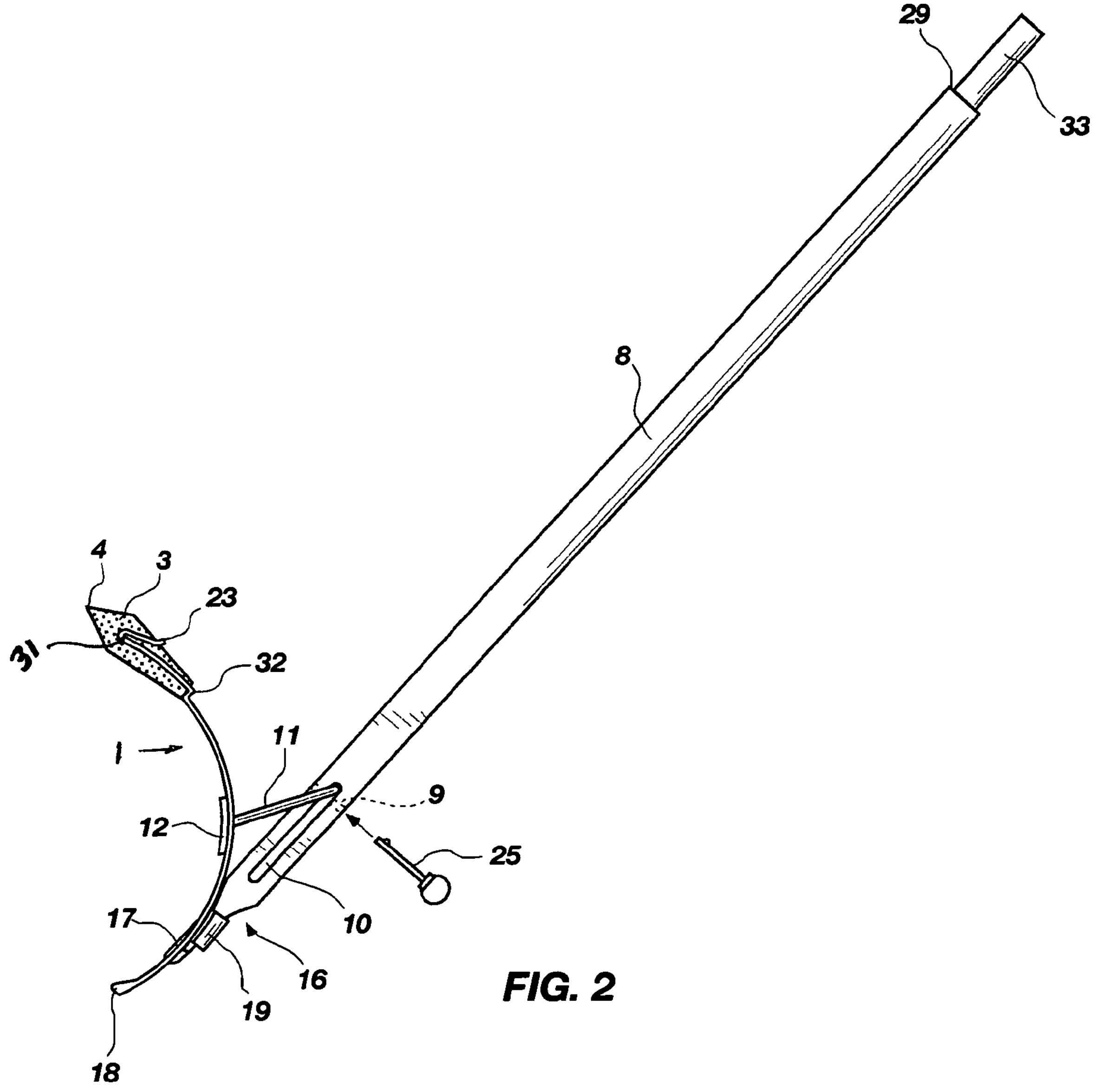
FIG. 2 is a side view of FIG. 1 without any preferred proximal handle embodiments shown
Figure 3:
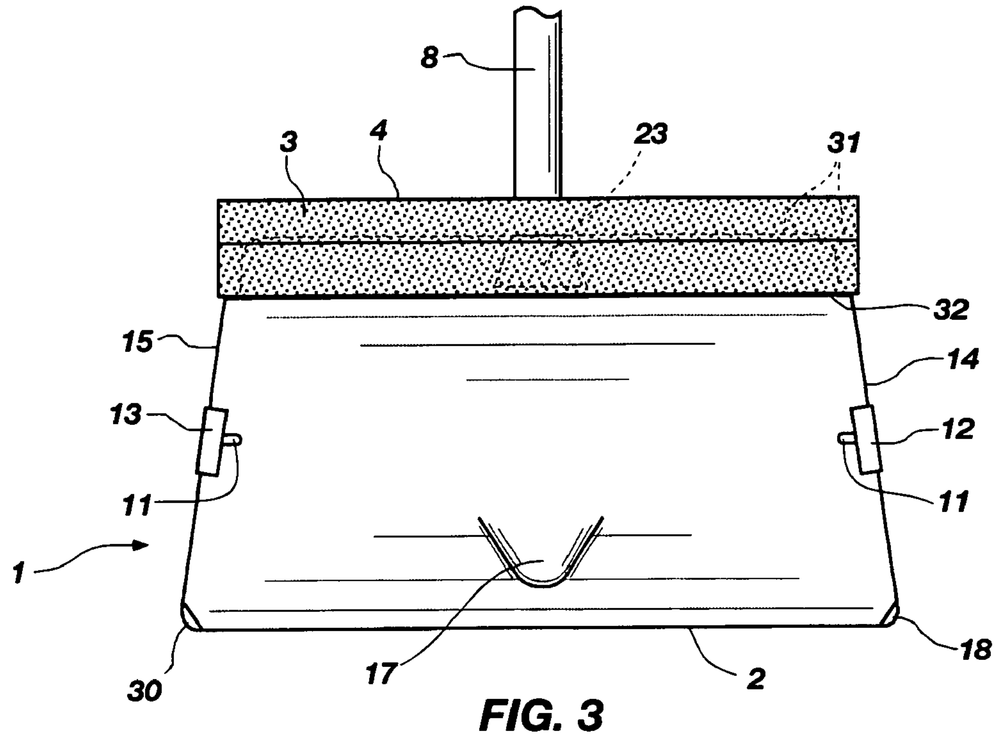
FIG. 3 is the front view of FIG. 1 with the handle thereof in fragmentary form.
Figure 4:
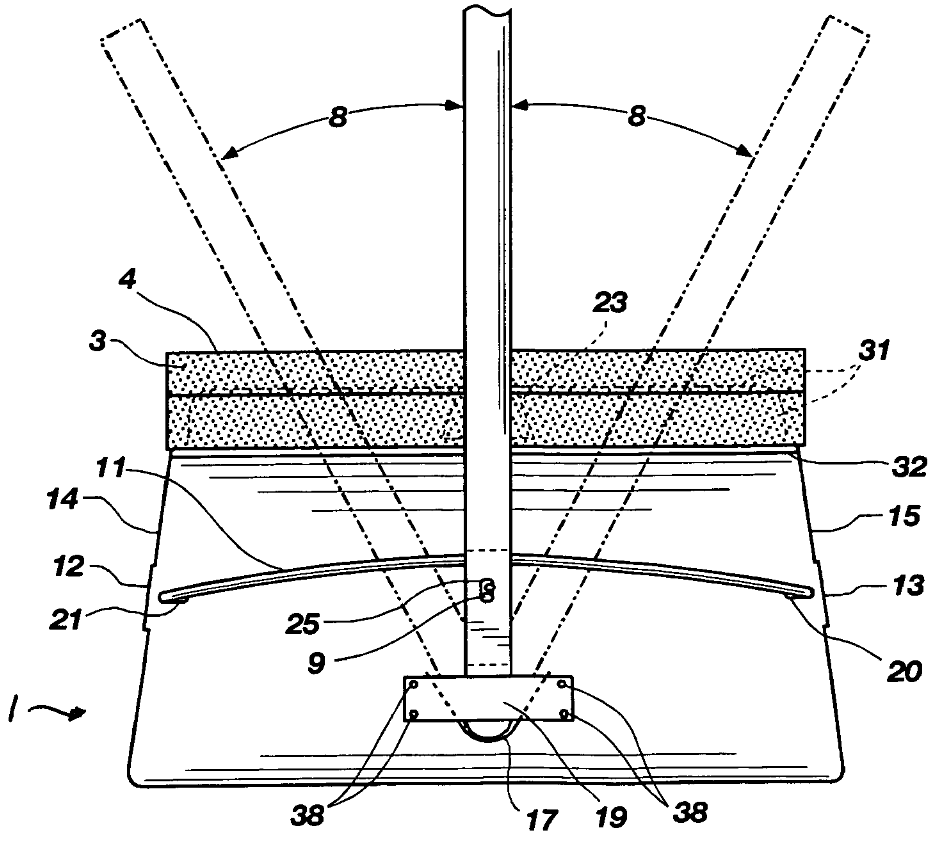
FIG. 4 is the back view of FIG. 1 with the handle thereof in fragmentary form, and showing (phantom) handle articulation, and unique handle attachment apparatus.
Figure 5:
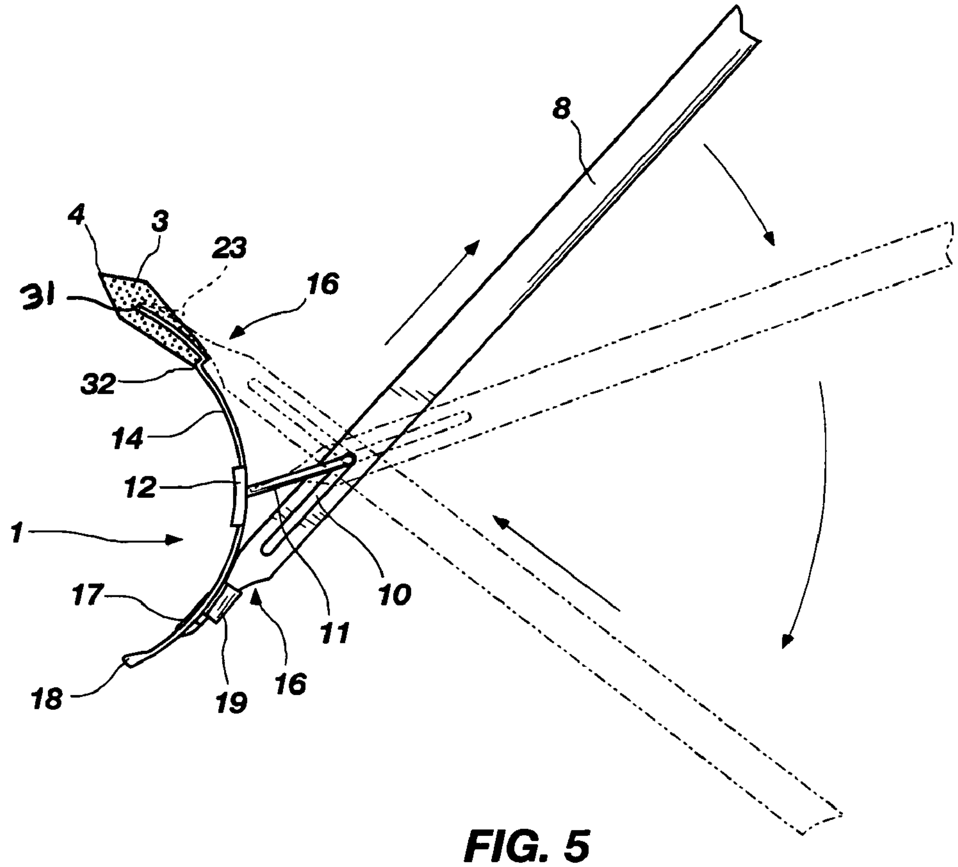
FIG. 5 is a side view of FIG. 1 with the handle thereof in fragmentary form, and showing (phantom) pivoting action of one preferred embodiment of a handle.
Figure 6:
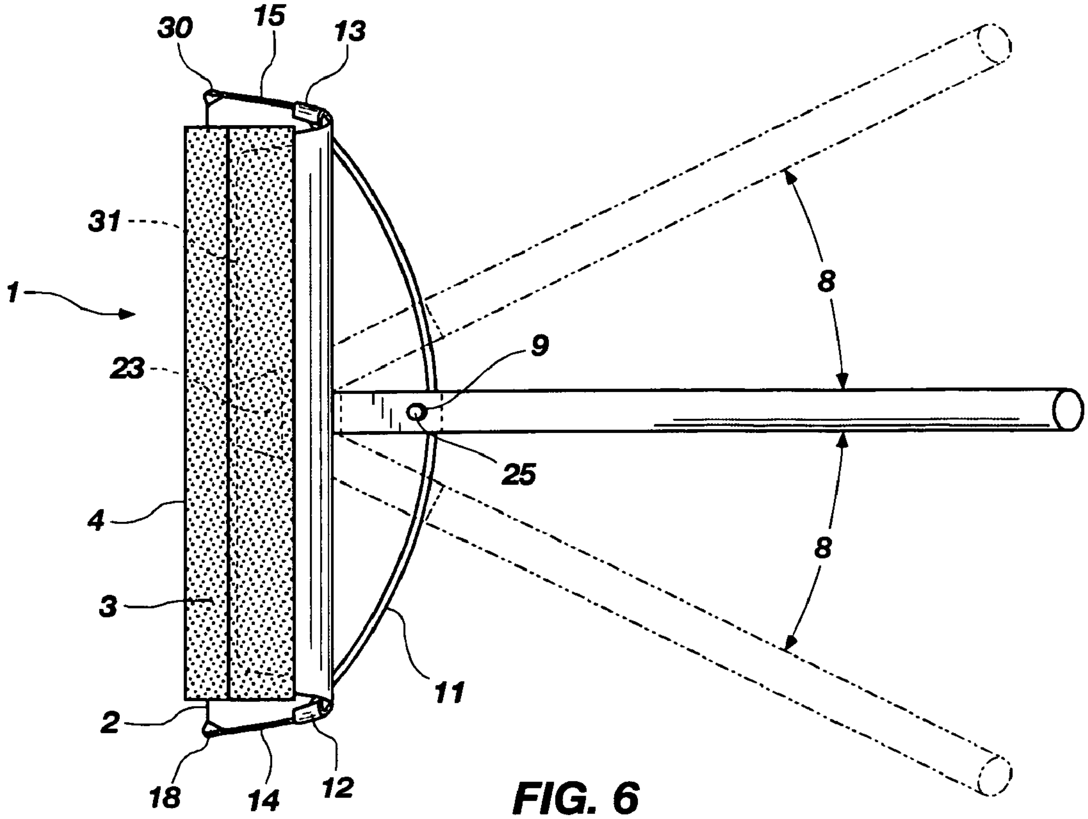
FIG. 6 is a top view of FIG. 1 with the handle thereof in fragmentary form, and showing (phantom) articulation.
Figure 7:
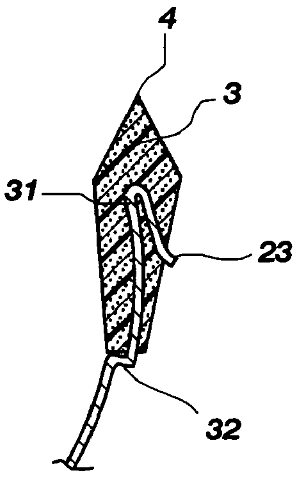
FIG. 7 is an exploded cross-sectional view of one of the preferred foam (cap) embodiments, and one of the preferred embodiments of the proximal end of the plastic blade.
Figure 8:
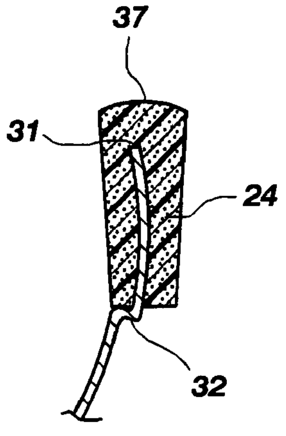
FIG. 8 is an exploded cross-sectional view of another preferred foam (cap) embodiment and another preferred embodiment of the proximal end of the plastic blade.
Figure 9:
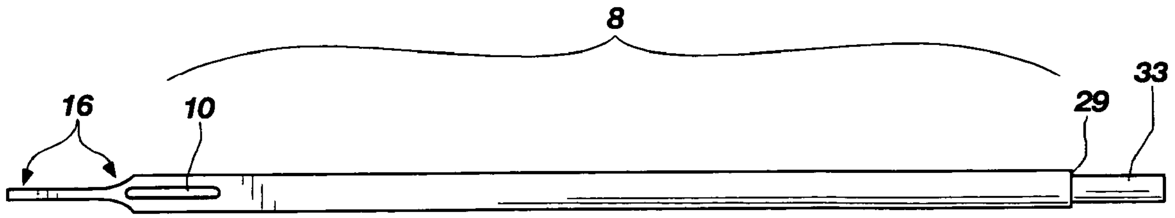
FIG. 9 is a detailed side view of the distal part of the two part handle. (From FIG. 1)
Figure 10:
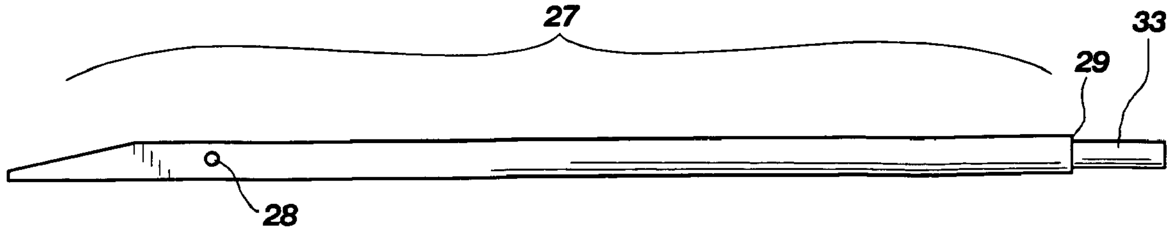
FIG. 10 is a detailed side view of another preferred handle embodiment. (From FIG. 11)
Figure 11:
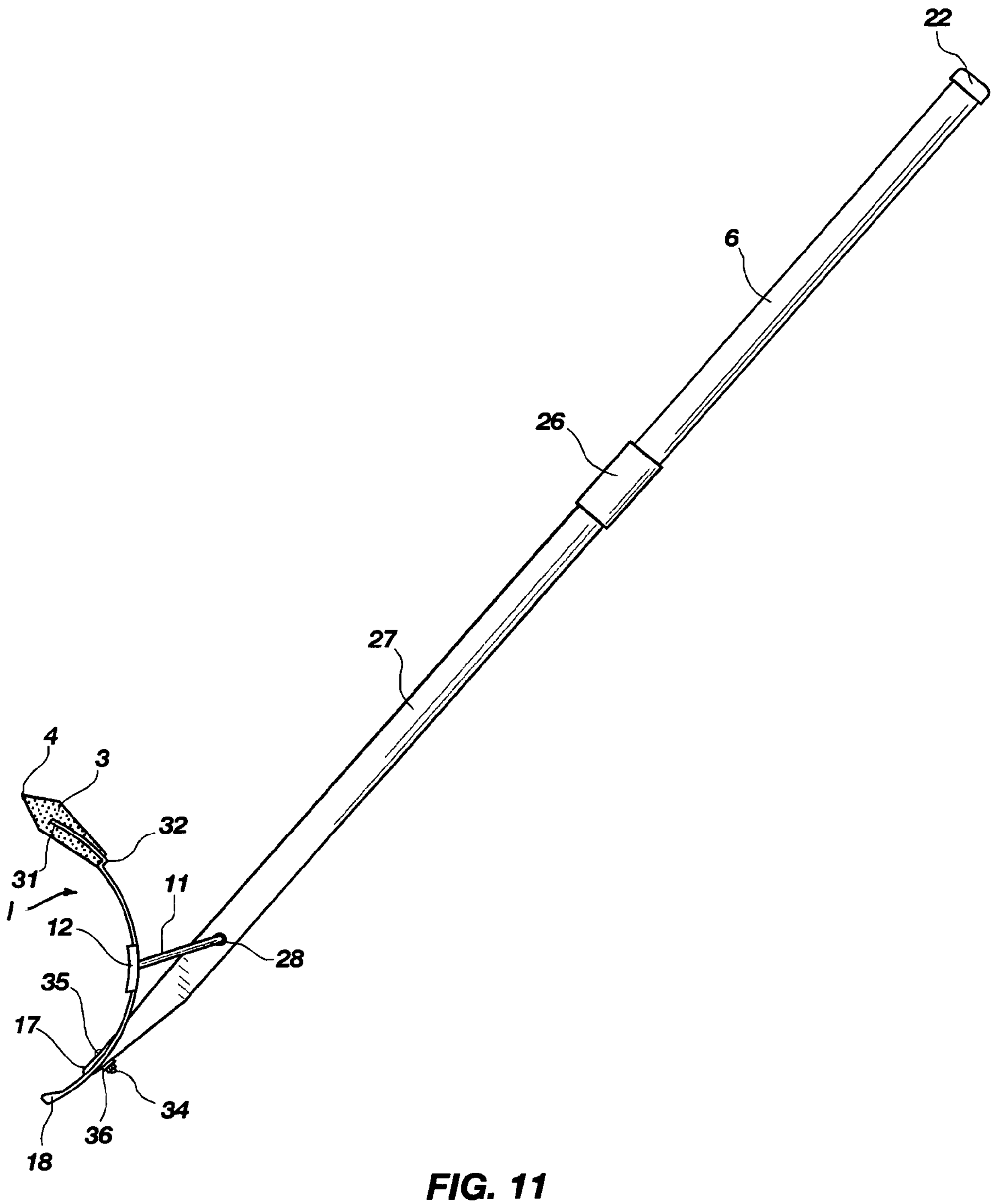
FIG. 11 is a side view of another preferred embodiment of the present invention, showing a different handle and handle attachment apparatus, connecting the handle to the blade.
Figure 12:
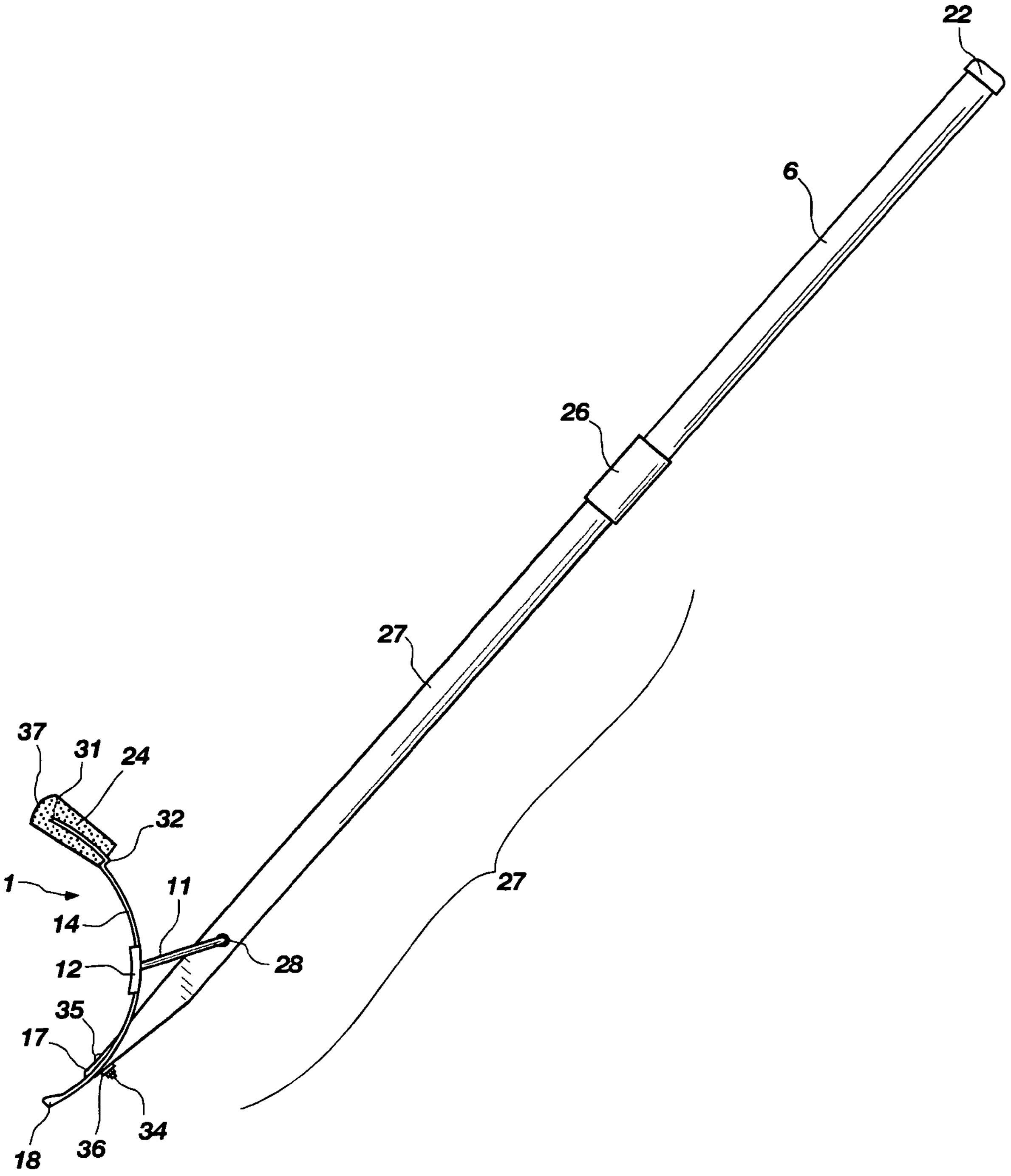
FIG. 12 is a side view of still another preferred embodiment of the present invention, showing the same handle attachment apparatus but still another preferred foam (cap) embodiment.
Figure 13:
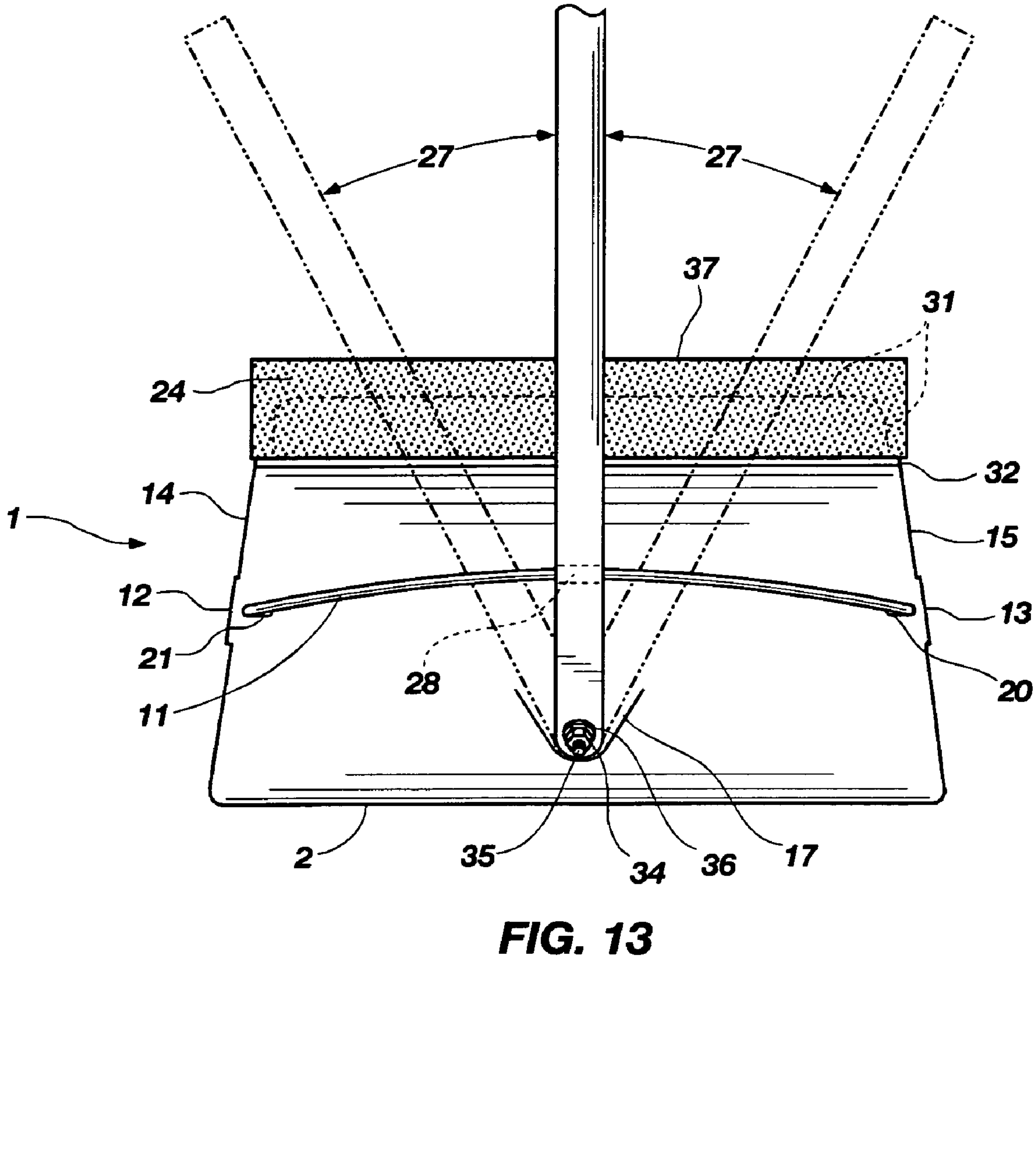
FIG. 13 is a back view of FIG. 12 showing (phantom) articulation of another preferred handle embodiment, which employs a nut and bolt attachment apparatus, while still employing the clip. (Stabilizer bar)

This invention employs two different materials to make the blade whole, so it is a dual edged blade, multi surface snow shovel/plow/rake. The blade, (1) employs both horizontal edges, the distal edge, (2) is a sturdy plastic, approximately 10" in height the top 3" of this plastic edge is cut away (31) which fits to the foam edge (3) (see drawings) there is also a step in the plastic, known as the tier (32) running the entire width of the blade (1) to seamlessly accommodate and hold foam edge (3) in place. The top edge, (3) of blade (1) is a foam cap of sorts it is a cross linked closed cell polyethylene foam, molded and formed to a relatively sharp point, (4) the over all blade, (1) is wider than it is tall; the over all shape of blade, (1) is of a standard crescent design, (new moon shaped). There is a two piece handle (5) the lower section is referred to as the handle stem (8). There is a taper (16) on handle stem (8) that seats into the distal handle well (17) and from the handle stems supine positions there is approximately a 90 degree angle between the two piece handle (5) and the tip of the foam edge (4). The handle stem has been turned round from square stock (wood) creating a shoulder (29) and a post (33 ). To fit the proximal (top) part of the two piece handle, (6) which is a plastic tube or pipe and can be up to 30" in length, also this handle can be topped off with a unique frost peeling ice scraping D-ring hand grip (7) or just capped (22). To make the handle (5) whole handle piece (6) slips over a small post (33) in the handle stem (8) and abuts to the shoulder (29) and a mid section hand grip (26) strengthens the union of the two piece handle (5). The handle stem (8) is left more square towards the bottom, it is approx 32" in length, and has a slot, (10) said tool employs a clip, (11) that works in coordination with the slot (10) (see drawings) the clip, (11) slides through, slot (10) parallel to the ground, the clip (11) (or stabilizer bar/compression brace) (11) is a "preferable" ¼" round bar arched or bent so as to spans the back of the blade, (1) and fit snugly through the slots (20) and (21) located on the back of blade (1) and into the stabilizer bar wells, (12) and (13) that are located on the inside face of blade (1) on both vertical sides, (14) and (15) of the blade (1) thereby clipping the distal end of the handle stem (8) onto the blade (1) the distal end of the handle stem (8) said taper (16) slips under a strong flexible strap (19) and directly into the handle well (17) located towards the bottom, back & center of blade (1) it is approximately 1¼" off edge (2). The taper (16) on handle stem (8) a long with the handle well (17) kick pin (25) and the strap (19) holds handle (5) in place. The strap (19) (pop riveted on) and the handle well (17) allows for the articulation of the handle (5) the kick pin limits the articulation of said handle (5) and prevents the handle (5) from slipping out of place. Under the foam edge (3) there a lip (23) which is a dual dihedral appendage off of (31) or the proximal end of the hard plastic edge (2) (see drawings) approx. 3"×3" the lip (23) folds back towards the center of blade (1) which traps the taper (16) on the handle stem (8). The kick pin (25) prevents the handle (5) from slipping out of place, under the lip (23) and limits the articulation, of the handle (5). So the handle well (17) strap (19) clip (11) slot (10) lip (23) the kick pin (25) and kick pin hole (9) all work in concert to allow for the pivoting and securing the handle (5) in place. The outside distal tips (18) & (30) of edge (2) on blade, (1) are rolled up slightly. This tool has available options. Such as an optional (handles) handle stem (27) which has a different taper and a hole (28) in place of the slot (10) ergo handle stem (27) bolts on with standard nut (34) bolt (35) and washer (36) combination. This tool can have an optional foam edge (24) (or cap) available with a blunt edge (37). 4 Pop rivets (38).

1) A dual edged blade multi surface snow removing device, comprising: A snow removing device that has a blade made of two different materials, plastic and foam, it has an articulating, pivoting two piece handle, the handle stem, and a grip end. With a Maximum total length 60" the handle stem is slightly larger, with a slot to accommodate the clip (stabilizer bar) said handle stem tapers at the distal end. The multi material blade/shovel heads overall size is approx 11" high 19" wide & approximately ⅙" to 1 " thick, the plastic part of this blade has a front and a back, and one tier or step. On the back of this plastic blade there is a flexible strap and 4 wells (like pockets) 2 of the wells are for the handle, they are located on or towards the horizontal edges. The other 2 wells for the clip are located on or near both arched vertical side's approx 5 inches up from the lower edge. The tool is made whole by attaching the handle to the blade, via a strap, clip, pin, and the wells. The distal tips of the blade are rolled up slightly. The top three inches of the plastic blade will be enveloped with a softer, replaceable, molded, closed cell foam edge (or cap), 4"×19". times.1" the base of the foam edge is approx ½" thick said base has a slit that runs length wise approx 3" deep, said cap stretch fit over the hard plastic blade. The upper middle part of said foam is approx. 1" thick and forms to a relatively sharp point, over extending the proximal edge of the concaved plastic blade by approx. 1" said foam is also wider than the top of said plastic blade by approximately 1" on each side. The handle has an auto lock on and let go feature, an optional unique ice scraping frost peeling D-ring hand grip (for windows on vehicles).

2) A snow removing device wherein said handle stems, preferred embodiment is wood worked to specs, and is approx. 32" in length and has been turned 1" round from square stock (See drawings).

3) A snow removing device wherein the top half of the handles preferred embodiment is a round piece of sturdy plastic tube or pipe up to 30" long with a preferred 1" inch O.D. and approx ⅞" I.D.

4) A snow removing device wherein a large clip is provided. Clipping said handle to said blade said clip also works as a stabilizer bar and or a compression brace, and a pivot point for said pivoting handle, said clip is made of (preferably ¼round bar). Approx. 20" long, arched or bent to spec. (see drawing).

5) A snow removing device wherein the material for the softer resilient said foam edge (or cap) is a cross linked, physically blown, closed cell, polyethylene, foam, with a density of 2 pounds per cubic foot, that is molded to spec. 4"×19"×1" (see drawings).

6) A snow removing device wherein the said foam edge has a skin that encapsulates all of said foam. Said closed cell material is slit to fit, and stretch fits over the top of said plastic blade.

7) A snow removing device wherein the said handle has the ability to tilt right and left (articulate).

8) A snow removing wherein the preferred material for body of said tiered blade is plastic.

9) A snow removing device wherein the over all width of said blade is approx. 19 inches & approx 11" in height.

10) A snow removing device wherein an auto lock device is rendered, concerning the attachment of said handle to said blade and the employment of both horizontal edges, via the taper on said handle stem, a well in the blade, and a lip on the blade, a flex's strap, and a kick pin. (Slip "N"Grip) (See drawings).

11) A snow removing device wherein the said two piece handle pivots almost 180 degrees. Total length is approximately 60."

12) A snow removing device wherein said foam makes up approx. ⅓of the entire blades surface, said closed cell foam is wider than the plastic blade by at approx. 1" on each side. The pointed edge of said foam overextends the plastic blade by at approx. 1" enveloping the entire top of the plastic blade, with said foam. The said foam is approx. 1" thick at the thickest point or approx. 8 times the thickness of the said plastic blade. (See drawings).

13) A snow removing device that has available to it, several optional (handles) or handle stem, that can be attached to the blade in different fashions, one of which would deny any articulation or pivoting action, (a common straight handle application) or another with a standard nut and bolt set up which employs (preferable) a ¼" hole instead of a slot. These options are for the express purpose of redefining the said tool and its abilities and its cost.

14) A snow removing device wherein a reinforced flexible strap approx. 6" long 1' wide ¼" thick, spans the distal handle well to help lock on and secure said handle/handle stem to said blade.

15) A snow removing device wherein a unique ice scraping, and frost peeling D-ring can be attached to the proximal end of said handle to improve the versatility and value of said tool. (See drawing).

16) A snow removing device wherein the slot in the said handle stem is approx. 3" long. times. ¼" wide (see drawings).

17) A snow removing device wherein a sleeve approx 6" long with 1" I.D. 1⅛" O.D. is provided to brace and fortify the connection point of said two piece handle.

18) A snow removing device wherein the assembly of said tool (from a customer point of view) uses only a single kick pin and then a combination of snug fitting compression joints, to uniquely clip together.

19) A snow removing device wherein the pointed foam edge (cap) can be used in the making of a totally new and different tool. Also an optional cross linked physically blown closed cell polyethylene foam with a density of 2 pounds per cubic foot is available with a preferred embodiment of approximately 3"×19"×1" thick. For the express purpose of redefining the said tool once again. (See drawings)

20) A snow removing device wherein two handle wells and two stabilizer bar wells (or sockets) are provided. (See drawings). A Hand held snow removing device is disclosed which is particularly intended for the use of manually removing snow off of 3 different surfaces safely. But primarily the exteriors of vehicles and out from between the vehicles. This device includes one blade made of two different materials. A concaved plastic blade, with a Cross linked physically blown closed cell polyethylene foam top edge. An elongated articulating/pivoting handle extends from the blade in a fashion that allows both the hard and soft edges to be employed quickly, for the different applications.

What is claimed is:

1. A snow removing device comprising:
- a blade including:
  - a convex rear side;
  - a supine concave front side;
  - two vertical edges defining the length thereof;
  - a base edge and a top edge defining the height thereof; and
  - wherein the two vertical edges, the base edge, and the top edge define the blade boundaries;
- a handle stem coupleable to the blade;
- a stabilizer bar extending between each of the vertical edges of the blade and through the handle stem with the handle stem movable thereon, and the stabilizer bar being compressible by the handle stem during snow removal to brace the blade to regulate attitude and angle of the blade with respect to the handle stem and a snow removal surface; and
- a soft edge disposed over the top edge.

2. The device of claim 1, wherein the soft edge includes a foam cap over the top edge.

3. The device of claim 1, wherein the handle stem is pivotable about the stabilizing bar to allow up to 180° flop of the blade with respect to the handle stem.

4. The device of claim 1, wherein the stabilizing bar extends through a slot in the handle stem extending lengthwise along the handle stem; and the device further including a kick pin disposed through the slot to secure the handle stem in place with respect to the stabilizing bar.

5. The device of claim 1 further including:
- a whole handle piece to couple to the handle stem; and
- a midsection hand grip to strengthen coupling of the whole handle piece and the handle stem.

6. The device of claim 1, further including a tier in the blade that runs the length thereof; wherein the soft edge is accommodated and held in pace at the tier.

7. The device of claim 1, wherein the handle stem is a whole handle with a distal end and a proximal end.

8. The device of claim 1, wherein the soft edge tapers to form a relatively sharp point.

9. The device of claim 1, wherein the handle stem slides on the stabilizer bar to orient the handle stem at a selectable angular orientation with respect to the blade.

10. The device of claim 1, wherein the handle stem is pivotable about the stabilizer bar with respect to the blade.

11. The device of claim 10, further comprising:
- a pair of opposing handle wells disposed in the convex rear side of the blade, each handle well being sized and shaped to receive the handle stem and positioned to orient the handle stem in a substantially opposite direction with respect to the blade when the handle stem is pivoted about the stabilizer bar to align the handle stem with one of the handle wells.

12. A snow removing device comprising:
- a blade including:
  - a convex rear side;
  - a supine concave front side;

two vertical edges defining the length thereof;

a base edge and a top edge defining the height thereof; and wherein the two vertical edges, the base edge, and the top edge define the blade boundaries;

a handle stem coupleable to the;

a stabilizer bar attached at each of the vertical edges and disposed through the handle stem such that the handle stem is pivotable about the stabilizer bar to allow up to 180° flop of the blade with respect to the handle stem; and a soft edge disposed over the top edge, the soft edge including a foam cap over the top edge, and a taper to form a relatively sharp point.

13. The device of claim 12, further including:

a tier in the blade that runs the length thereof; wherein the soft edge is accommodated and held in place at the tier.

14. The device of claim 12 further including:

a whole handle piece to couple to the handle stem; and a midsection hand grip to strengthen coupling of the whole handle piece and the handle stem.

15. The device of claim 12, further comprising:

a pair of opposing handle wells disposed in the convex rear side of the blade, each handle well being sized and shaped to receive the handle stem and positioned to orient the handle stem in a substantially opposite direction with respect to the blade when the handle stem is rotated about the stabilizer bar to align the handle stem with one of the handle wells.

16. The device of claim 12, wherein the handle stem slides on the stabilizer bar to orient the handle stem at a selectable angular orientation with respect to the blade.

17. The device of claim 12, wherein the stabilizer bar is compressible by the handle stem during snow removal to form a compression brace between the handle stem and the blade, and to regulate attitude and angle of the blade with respect to a snow removal surface.

18. A snow removing device comprising:

a blade including:

a convex rear side;

a supine concave front side;

two vertical edges defining the length thereof; and a base edge and a top edge defining the height thereof;

a handle stem coupleable to the blade;

a stabilizer bar attached to the blade and extending through the handle stem so the handles stem pivots about the stabilizer bar and tilts on the stabilizer bar in relation to the blade; and the stabilizer bar being compressible by the handle stem to brace the blade and to regulate attitude and angle of the blade during snow removal with respect to a snow removal surface.

19. The device of claim 18, wherein the stabilizer bar forms a compression brace between the handle stem and the blade.

20. The device of claim 18, further comprising:

a pair of opposing handle wells disposed in the convex rear side of the blade, each handle well being sized and shaped to receive the handle stem and positioned to orient the handle stem in a substantially opposite direction with respect to the blade when the handle stem is rotated about the stabilizer bar to align the handle stem with one of the handle wells.

* * * * *